United States Patent [19]
Fujita et al.

[11] Patent Number: 6,154,009
[45] Date of Patent: Nov. 28, 2000

[54] POWER SUPPLY MONITORING IC AND BATTERY PACK

[75] Inventors: Hiroyuki Fujita; Koichi Inoue, both of Kyoto, Japan

[73] Assignee: Rohm Co., Ltd., Kyoto, Japan

[21] Appl. No.: 09/341,685

[22] PCT Filed: Jan. 28, 1998

[86] PCT No.: PCT/JP98/00380

§ 371 Date: Jul. 22, 1999

§ 102(e) Date: Jul. 22, 1999

[87] PCT Pub. No.: WO98/33257

PCT Pub. Date: Jul. 30, 1998

[30] Foreign Application Priority Data

Jan. 29, 1997 [JP] Japan ................................... 9-015099

[51] Int. Cl.⁷ ................ H02J 7/00; H02J 7/24; H02H 7/18; G01N 27/416
[52] U.S. Cl. ................ 320/134; 320/164; 320/166; 307/10.7; 324/433
[58] Field of Search ................... 320/166, 134, 320/162, 163, 164; 330/250; 324/433; 307/10.7

[56] References Cited

U.S. PATENT DOCUMENTS

| | | | |
|---|---|---|---|
| 4,127,886 | 11/1978 | Easter | 361/81 |
| 4,581,571 | 4/1986 | Hansen | 320/134 |
| 5,547,775 | 8/1996 | Eguchi et al. | 429/7 |
| 5,654,622 | 8/1997 | Toya et al. . | |
| 5,703,463 | 12/1997 | Smith | 320/134 |
| 5,742,148 | 4/1998 | Sudo et al. | 320/134 |

FOREIGN PATENT DOCUMENTS

| | | |
|---|---|---|
| 3016108 | 10/1980 | Germany . |
| 55-143471 | 11/1980 | Japan . |
| 5-111177 | 4/1993 | Japan . |
| 5-147733 | 6/1993 | Japan . |
| 5-176479 | 7/1993 | Japan . |
| 7-147733 | 6/1995 | Japan . |
| 8-98413 | 4/1996 | Japan . |
| 8-222275 | 8/1996 | Japan . |
| 8-289478 | 11/1996 | Japan . |
| 2051382A | 1/1981 | United Kingdom . |

*Primary Examiner*—Peter S. Wong
*Assistant Examiner*—Gregory S. Toatley, Jr.
*Attorney, Agent, or Firm*—Arent Fox Kintner Plotkin & Kahn, PLLC

[57] ABSTRACT

In a power supply monitoring integrated circuit device, a capacitor for setting a non-responsive interval is discharged at an increased rate without an undue increase in the current consumption of the circuit of the device and without undue variations in the non-responsive interval. The power supply monitoring integrated circuit device has a capacitor, a current source for charging the capacitor, a Darlington-connected transistor for discharging the capacitor, and a comparing means for comparing the voltage across the capacitor with a predetermined non-responsive interval setting voltage. An offset voltage equal to the collector-emitter voltage of the transistor when the capacitor is discharged is produced by using the forward voltage of a diode so as to be added to the non-responsive interval setting voltage.

7 Claims, 6 Drawing Sheets

POWER SUPPLY MONITORING IC AND BATTERY PACK

TECHNICAL FIELD

The present invention relates to a power supply monitoring integrated circuit device (hereafter a "power supply monitoring IC") for monitoring the voltage of a lithium-ion cell or the like, and to a battery pack incorporating such a power supply monitoring IC.

BACKGROUND ART

A power supply monitoring IC monitors the voltage of a cell such as a lithium-ion cell and performs control operations necessary to prevent the cell from being brought into an overcharged or overdischarged state. For example, when the voltage of the cell becomes higher than an overcharge voltage, the power supply monitoring IC outputs a control signal to turn off a switching device connected in series with the cell, and thereby inhibits the charging of the cell. With a lithium-ion cell, the overcharge voltage is, for example, 4.2 V.

Figure 3:
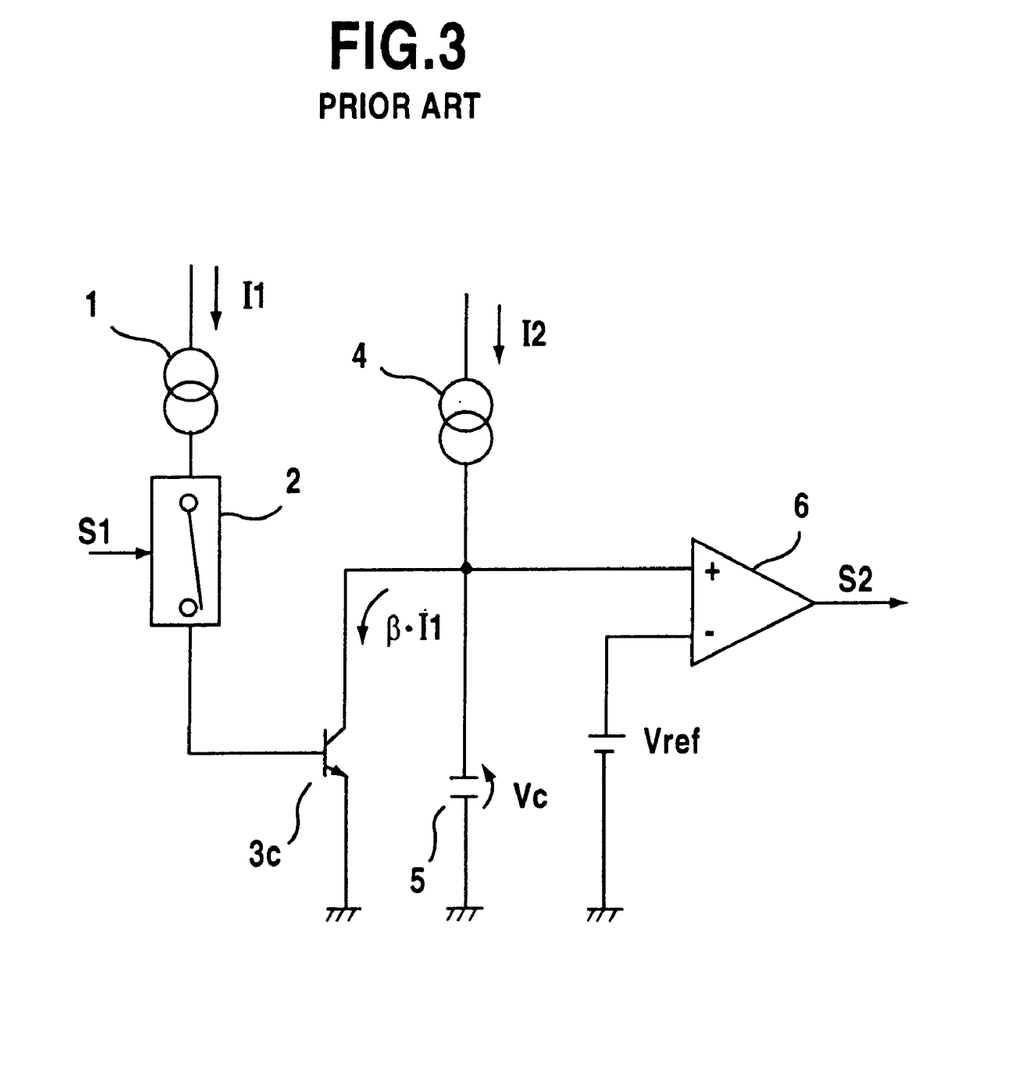
FIG. 3 is a circuit diagram of the non-responsive interval setting circuit used in a conventional power supply monitoring IC.

However, the voltage (i.e. the detected voltage) of the cell, when the cell is charged to close to the overcharge voltage, may temporarily exceed the overcharge voltage because of noise or the like. In such a case, if the power supply monitoring IC in response thereto immediately outputs the control signal, erroneous detection results. This makes it impossible to charge the cell so fully as to have a voltage close enough to the overcharge voltage, and thus causes the cell to last for an accordingly shorter length of time than it should. For this reason, as shown in FIG. 3, the power supply monitoring IC is provided with a non-responsive interval setting circuit for setting a non-responsive interval in which it does not respond to noise (i.e. the interval in which it does not output the control signal in response to noise). Thus, only when the detected voltage remains higher than the overcharge voltage for a longer period of time than the non-responsive interval, does the power supply monitoring IC output the control signal. In this way, erroneous detection is prevented.

In FIG. 3, a constant current source 1, which outputs a current I1, is connected through a switching device 2 to the base of a transistor 3c. When the voltage of the cell exceeds the overcharge voltage, a high-level signal S1 is applied to the switching device. When this signal S1 is applied to the switching device 2, the switching device 2 is turned off. As the switching device 2, a switching transistor or the like is used. The transistor 3c has its emitter connected to ground, and has its collector connected to the constant current source 4.

Between the collector of the transistor 3c and ground, a capacitor 5 for setting the non-responsive interval is connected. To detect the voltage across the capacitor 5, the non-inverting input terminal (+) of a comparator 6 is connected to the collector of the transistor 3c, and to the inverting input terminal (−) of the comparator 6 is fed a voltage higher than the ground level by a non-responsive interval setting voltage Vref.

According to this circuit configuration, when the voltage of the cell becomes higher than the overdischarge voltage, the signal S1 is fed. Then, the switching device 2 is turned off, and thus the transistor 3c is turned off. Then, the current I2 from the constant current source 4 is fed to the capacitor 5 to charge it. This causes the voltage Vc across the capacitor 5 to increase linearly. The comparator 6 compares this voltage Vc with a predetermined non-responsive interval setting voltage Vref, and outputs a high level if the voltage Vc is higher than Vref or a low level if the voltage Vc is lower than Vref.

Figure 4:
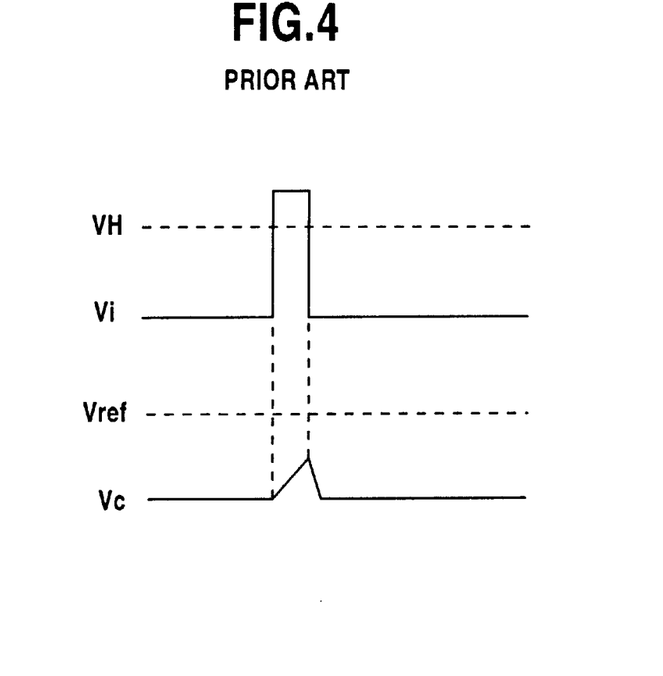
FIG. 4 is a waveform diagram illustrating the operation of the circuit shown in FIG. 3 when the cell voltage it receives contains noise.

Now, consider a case where noise happens to generate the signal S1. Then, the switching device 2 is turned off, and thus the transistor 3c is turned off. As a result, the capacitor 5 starts being charged. However, since noise usually lasts for a short period of time (i.e. is narrow in width), the signal S1 disappears in a moment, turning the switching device 2 and the transistor 3c on. Thus, the voltage Vc across the capacitor 5 does not become higher than the voltage Vref. This case is illustrated in FIG. 4. In FIG. 4, VH represents the overcharge voltage, Vi represents the input voltage (in this case, the composite voltage of the cell voltage and the noise). When the transistor 3c is on, its collector current β·I1 (where β represents the current amplification factor of the transistor 3c) is allowed to flow, and thus the capacitor 5 is discharged. In this way, even if the detected voltage temporarily exceeds the overcharge voltage because of noise or the like, the comparator 6 does not output a signal S2.

Figure 5:
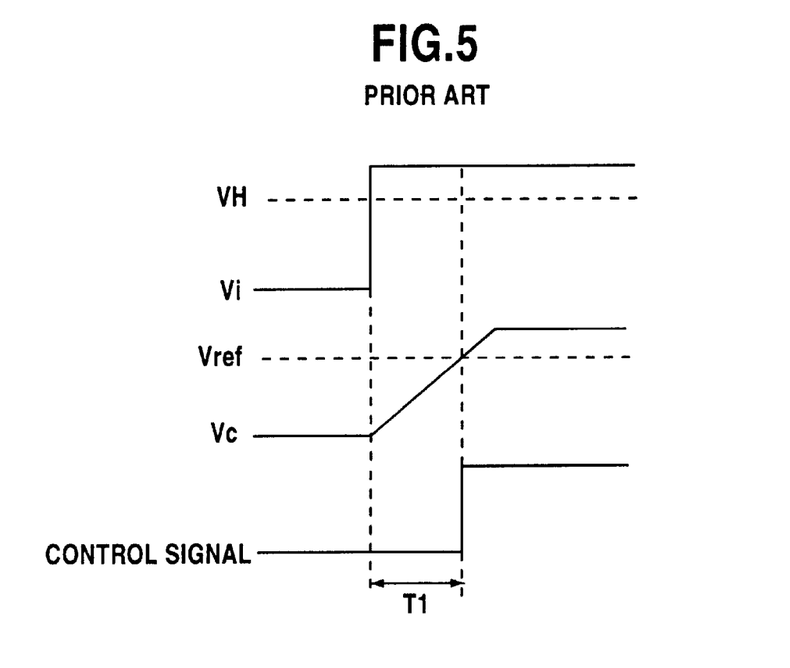
FIG. 5 is a waveform diagram illustrating the operation when the cell voltage remains higher than the overcharge voltage for a period of time longer than the non-responsive interval.

By contrast, as illustrated in FIG. 5, when the detected voltage remains higher than the overcharge voltage for a longer period of time than an interval T1, the signal S1 keeps the switching device 2 off and the transistor 3c on for a sufficiently long period of time to allow the voltage across the capacitor 5 to rise. When the voltage Vc becomes higher than the voltage Vref, the power supply monitoring IC outputs the signal S2 as a control signal. This interval T1 is the on-responsive interval, which is given by the following formula:

$$T1 = C \cdot (Vref - Vsat)/I2$$
$$\approx C \cdot Vref/I2$$

(where C represents the capacitance of the capacitor 5, Vsat represents the collector-emitter voltage of the transistor 3c when the capacitor 5 is discharged, and Vsat≈0)

Figure 6:
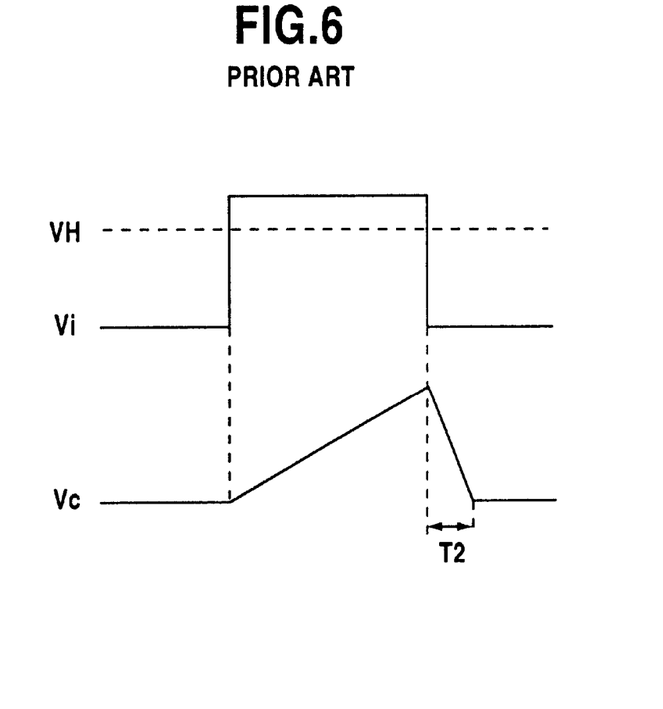
FIG. 6 is an enlarged waveform diagram of FIG. 4.
Figure 7:
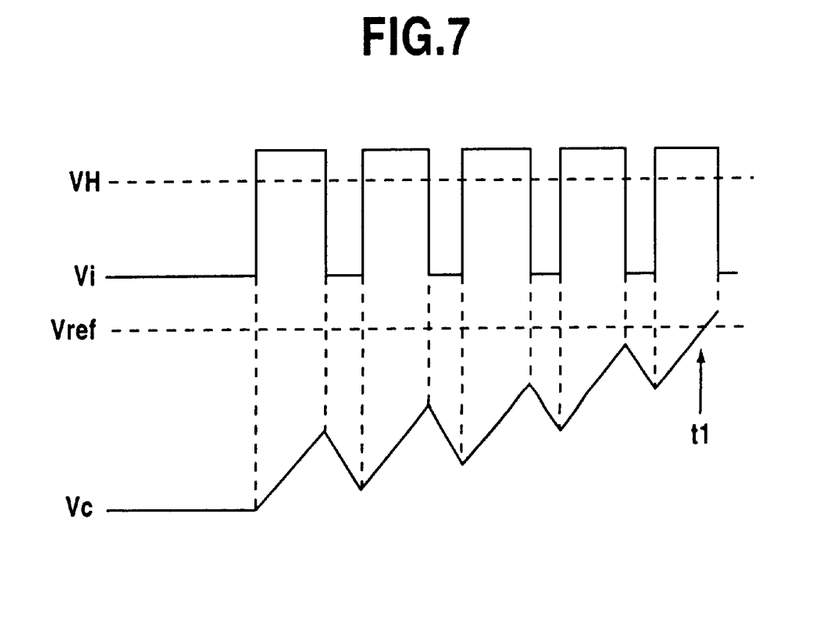
FIG. 7 is a waveform diagram illustrating an example of erroneous detection due to continuous high-frequency noise.

However, in this conventional power supply monitoring IC, as shown in FIG. 6, which is an enlarged version of the waveform diagram shown in FIG. 4, the discharging of the capacitor requires an interval T2, and this interval T2 is difficult to reduce to as short as a several-hundredth to a several-thousandth of the charging interval T1. For this reason, in an appliance such as a portable telephone that incorporates a high-frequency clock, the input voltage Vi may exhibit a waveform as shown in FIG. 7 because of continuous high-frequency noise. In such a case, the capacitor 5 starts being charged before it is discharged completely, and therefore the voltage Vc gradually rises until, at a point of time t1, it reaches the voltage Vref. As a result, the comparator 6 outputs a high level as the signal S2. In this way, high-frequency noise tends to cause malfunctioning.

Figure 8:
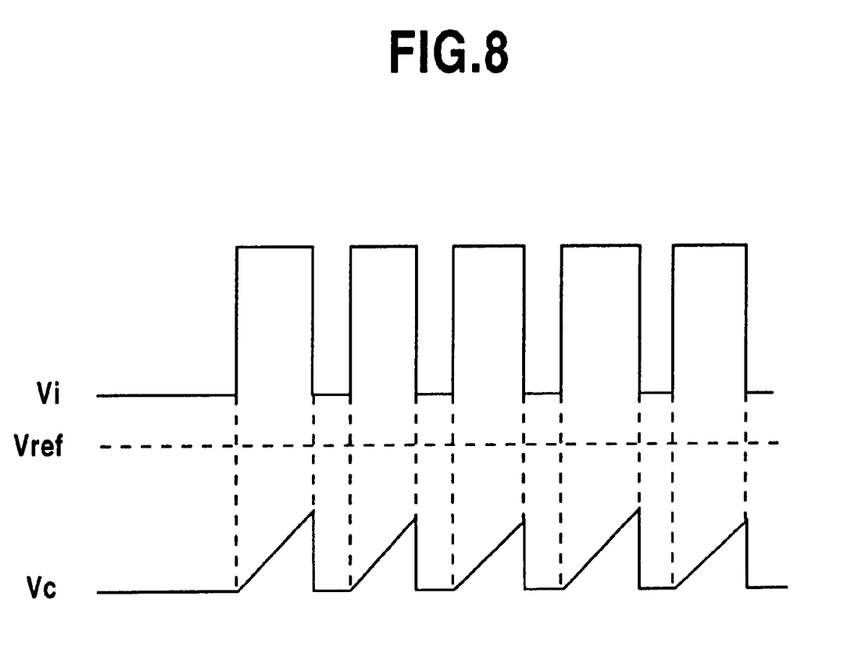
FIG. 8 is a waveform diagram illustrating how erroneous detection is prevented if discharging is achieved at an increased rate.

To prevent such malfunctioning, it is necessary, as shown in FIG. 8, to maximize the discharging rate of the capacitor 5 and thereby minimize the period T2 (see FIG. 6). However, in the conventional power supply monitoring IC described above, the discharging is achieved by the collector current β·I1 of the transistor 3c, and therefore, to increase the discharging rate, it is inevitable to increase the current I1. This inconveniently increases the current consumption of the power supply monitoring IC. Since the power supply monitoring IC performs its monitoring operations by using the current fed from the cell, an increase in its current consumption is undesirable.

Moreover, the voltage Vsat depends on temperature, and thus manufacturing- and temperature-related variations in the characteristics of circuit elements used lead to inaccurate setting of the non-responsive interval.

DISCLOSURE OF THE INVENTION

An object of the present invention is to provide a power supply monitoring IC that permits a capacitor for setting a non-responsive interval to be discharged at an increased rate without an undue increase in the current consumption of the circuit of the IC and without undue variations in the non-responsive interval, and a battery pack employing such a power supply monitoring IC.

Another object of the present invention is to provide a power supply monitoring IC that is not prone to malfunctioning due to continuous high-frequency noise, and a battery pack employing such a power supply monitoring IC.

To achieve the above object, according to one aspect of the present invention, in a power supply monitoring integrated circuit device has a circuit for outputting a first signal indicating whether the voltage of a cell is higher than a predetermined value or not, a capacitor, a first current source for supplying a charging current to the capacitor, a transistor for forming a discharging path of the capacitor, a means for controlling the charging and discharging of the capacitor according to the first signal, and a comparing means for comparing the voltage across the capacitor with a predetermined non-responsive interval setting voltage so as to output a second signal inhibiting the operation of the cell when the voltage across the capacitor is higher than the non-responsive interval setting voltage, an offset is added to the non-responsive interval setting voltage by using the forward voltage of a diode.

According to this circuit configuration, the power supply monitoring IC monitors the cell and, for example when the voltage of the cell becomes higher than the predetermined overcharge voltage, turns off the transistor to charge the capacitor by using the first current source. This causes the voltage across the capacitor to rise gradually, and meanwhile this voltage is compared by the comparing means with the non-responsive interval setting voltage. At the end of the non-responsive interval, the voltage across the capacitor is higher than the non-responsive interval setting voltage, and thus the comparing means outputs an inhibition signal. In response to this inhibition signal, the power supply monitoring IC turns off, for example, a switching device connected in series with the cell and thereby inhibits the use of the cell.

If the voltage of the cell temporarily becomes higher than the overcharge voltage because of noise or the like, the capacitor is discharged by the transistor. Thus, even if the voltage of the cell remains higher than the overcharge voltage for a period of time shorter than the non-responsive interval, the comparing means does not output the inhibition signal. Moreover, since an offset is added to the non-responsive interval setting voltage by the diode, it is possible to cancel the temperature characteristics of the discharging transistor, and thereby reduce variations in the non-responsive interval.

According to another aspect of the present invention, in a power supply monitoring integrated circuit device having a circuit for outputting a first signal indicating whether the voltage of a cell is higher than a predetermined value or not, a capacitor, a first current source for supplying a charging current to the capacitor, a transistor for forming a discharging path of the capacitor, a means for controlling the charging and discharging of the capacitor according to the first signal, and a comparing means for comparing the voltage across the capacitor with a predetermined non-responsive interval setting voltage so as to output a second signal inhibiting the operation of the cell when the voltage across the capacitor is higher than the non-responsive interval setting voltage, the transistor forming the discharging path is a Darlington-connected transistor that receives the first signal at its input electrode.

According to this circuit configuration, it is possible to discharge the capacitor at an increased rate. Moreover, it is possible to reduce the base current of the transistor while keeping a high discharging rate, and thereby reduce the current consumption of the power supply monitoring IC.

BEST MODE FOR CARRYING OUT THE INVENTION

Figure 1:
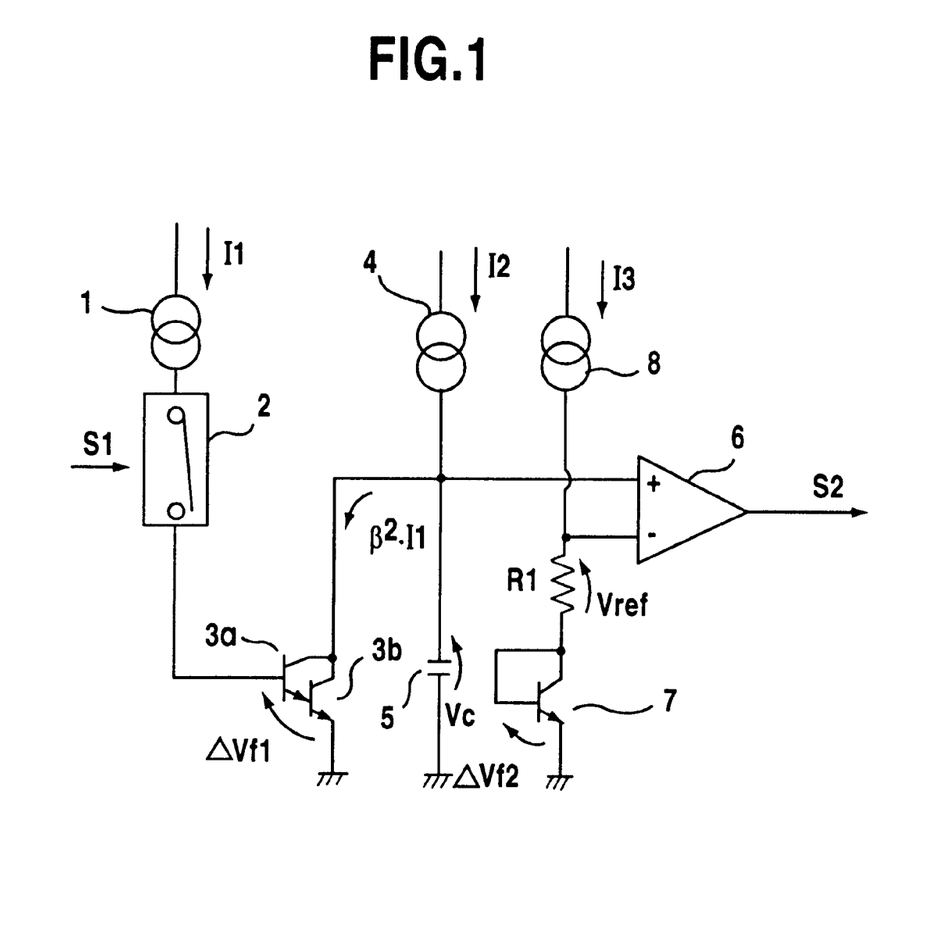
FIG. 1 is a circuit diagram of the non-responsive interval setting circuit used in a power supply monitoring IC according to the present invention.

An embodiment of the present invention is shown in FIG. 1. FIG. 1 is a circuit diagram of the non-responsive interval setting circuit used in the power supply monitoring IC of this embodiment. Note that in FIG. 1, such elements as are found also in FIG. 3 are identified with the same reference numerals and symbols, and overlapping descriptions will not be repeated.

A constant current source 1 is connected through a switching device 2 to the base of a transistor 3a that, together with another transistor 3b, forms a Darlington-connected pair of NPN-type transistors 3a and 3b. The switching device 2 is realized by the use of, for example, a switching transistor. The emitter of the transistor 3b is connected to ground. The collectors of the transistors 3a and 3b are connected to a constant current source 4. Between the collectors of the transistors 3a and 3b and ground is connected a capacitor 5 for setting the non-responsive interval.

To monitor the voltage Vc across the capacitor 5, the non-inverting input terminal (+) of a comparator 6 is connected to the collectors of the transistors 3a and 3b. To the inverting input terminal (−) of the comparator 6 is fed a non-responsive interval setting voltage Vref that is obtained as a voltage drop occurring across a resistor R1 as a result of the current I3 fed from a constant current source 8 flowing therethrough. In series with the resistor R1, a diode-connected transistor 7 is connected. The transistor 7 has its emitter grounded and has its base and collector connected to the resistor R1.

Next, how the power supply monitoring IC shown in FIG. 1 operates will be described. The constant current source 1 outputs a current I1. When the voltage of the cell is higher than an overcharge voltage, a signal S1 appears. In response to the signal S1, the switching device 2 is turned off. When the signal S1 is absent, the switching device 2 is kept on, and thus, through the Darlington-connected transistors 3a and 3b, a discharging current $\beta^2 \cdot I1$ flows out of the capacitor 5. Here, $\beta$ represents the current amplification factor of the transistors 3a and 3b.

In contrast to the conventional circuit (FIG. 3) described earlier, in which the collector current of the transistor 3c is $\beta \cdot I1$, in this embodiment, the corresponding current is $\beta^2 \cdot I1$, which signifies an increased discharging rate. Accordingly, even in the presence of continuous high-frequency noise as shown in FIG. 8, the capacitor 5 is saved from accumulation of electric charge, and thus malfunctioning due to erroneous detection is prevented. Moreover, an increased discharging rate makes it possible to reduce the current I1 and thereby reduce the current consumption of the power supply monitoring IC.

In addition, in this embodiment, to the non-responsive interval setting voltage Vref, the forward voltage of the diode formed by the transistor 7 is added as an offset voltage $\Delta$Vf2. Here, $\Delta$Vf2$\approx\Delta$Vf1+Vsat, where $\Delta$Vf1 represents the base-emitter voltage of the transistor 3a when the capacitor 5 is discharged and Vsat represents the collector-emitter voltage of the transistor 3b when the capacitor 5 is discharged. Hence, the non-responsive interval T1 set by the capacitor 5 is given by the following formula:

$$T1=C \cdot [(Vref+\Delta Vf2-(\Delta Vf1+Vsat)]/I2$$

$$\approx C \cdot Vref/I2$$

(Here, C represents the capacitance of the capacitor 5)

In this way, the offset is canceled because $\Delta$Vf2$\approx\Delta$Vf1+ Vsat, and therefore the non-responsive interval is set at the same value T1$\approx$C·Vref/I2 in this embodiment as in the conventional power supply monitoring IC (FIG. 3) described earlier. Moreover, the transistors 7 and 3b mutually cancel manufacturing- and temperature-related variations in their characteristics, and thereby reduce variations in the non-responsive interval. The non-responsive interval can be set at any value in the range approximately from tens of milliseconds to several seconds.

Figure 2:
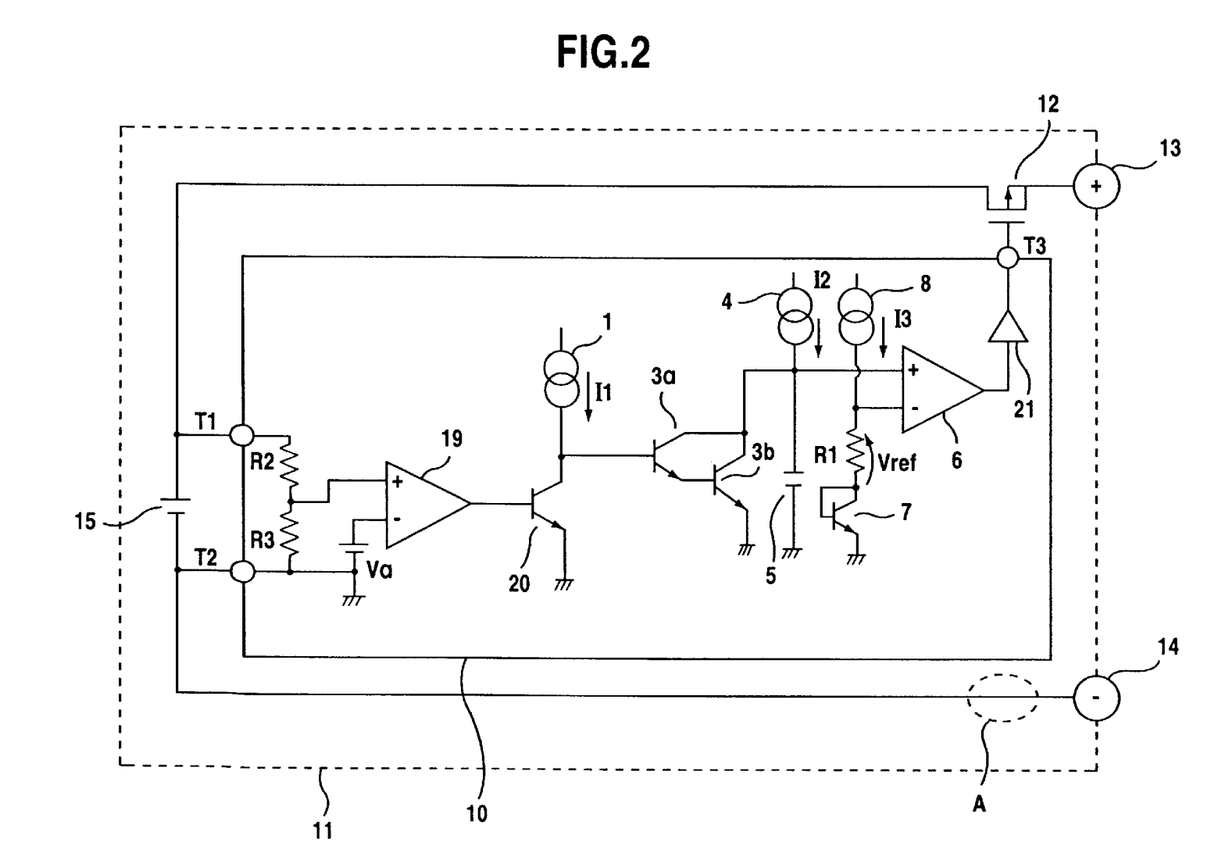
FIG. 2 is a circuit diagram of a battery pack incorporating the non-responsive interval setting circuit shown in FIG. 1.

Next, with reference to FIG. 2, a description will be given of a lithium-ion power supply apparatus 11 (referred to as a "battery pack" in the present specification) having a power supply monitoring IC 10 incorporating the non-responsive interval setting circuit (see FIG. 1) described above. FIG. 2 is a circuit diagram of this battery pack 11. When a lithium-ion cell 15 is brought into an overcharged state, there is a risk of smoking and the like. For this reason, the power supply monitoring IC 10 monitors the voltage of the cell 15 to prevent it from being brought into an overcharged state.

The higher potential end of the cell 15 is connected to a terminal T1 of the power supply monitoring IC 10 and to the source of a P-channel MOSFET (metaloxide semiconductor field-effect transistor) 12. The drain of the MOSFET 12 is connected to a positive terminal 13 of the battery pack 11. The gate of the MOSFET 12 is connected to a terminal T3 of the power supply monitoring IC 10, and thus the MOSFET 12 is turned on and off by the power supply monitoring IC 10. Here, the MOSFET 12 acts as a switching device. The lower potential end of the cell 15 is connected to a terminal T2 of the power supply monitoring IC 10 and to a negative terminal 14 of the battery pack 11.

Within the power supply monitoring IC 10, a circuit having resistors R2 and R3 connected in series is connected to the terminals T1 and T2. The node between the resistors R2 and R3 is connected to the non-inverting input terminal (+) of a comparator 19. To the inverting input terminal (−) of the comparator 19 is fed a voltage higher than the ground level by a voltage Va. The output of the comparator 19 is connected to the base of a transistor 20. The transistor 20 has its emitter connected to ground, and has its collector connected to a constant current source 1. The collector of the transistor 20 is connected to the base of a transistor 3a, which is one of a Darlington-connected pair of transistors.

The emitter of a transistor 3b, which is the other of the Darlington-connected pair of transistors, is connected to ground. The collectors of the transistors 3a and 3b are connected to a constant current source 4. Between the collectors of the transistors 3a and 3b and ground is connected a capacitor 5 for setting the non-responsive interval. The non-inverting input terminal (+) of a comparator 6 is connected to the collectors of the transistors 3a and 3b. To the inverting input terminal (−) of the comparator 6 is fed a non-responsive interval setting voltage Vref that is obtained as a voltage drop occurring across a resistor R1 as a result of the current I3 fed from a constant current source 8 flowing therethrough. In series with the resistor R1, a diode-connected transistor 7 is connected as shown in the figure.

The output of the comparator 6 is connected to a buffer circuit 21. The buffer circuit 21, when it receives a high-level signal from the comparator 6, outputs a control signal by which the MOSFET 12 connected to the terminal T3 is turned off. Note that, in FIG. 2, such elements as are found also in FIG. 1 are identified with the same reference numerals and symbols, and overlapping descriptions will not be repeated. Note also that, in FIG. 2, the switching device, formed by the transistor 20, is inserted in a position different from the position of the corresponding element in FIG. 1.

According to the circuit configuration shown in FIG. 2, during discharging of the cell 15, the battery pack 11 supplies electric power to an appliance (not shown), such as a portable telephone or personal computer, connected to the positive and negative terminals 13 and 14. During charging the battery pack 11 feeds a current to the cell 15 from a direct-current power source for charging (not shown) connected to the positive and negative terminals 13 and 14.

The comparator 19 checks whether the voltage of the cell 15 is higher than an overcharge voltage. When the voltage of the cell 15 becomes higher than the overcharge voltage, the comparator 19 outputs a high level and thereby turns on the transistor 20. As a result, the current I1 from the constant current source 1 flows through the transistor 20, and thus it no longer flows into the base of the transistor 3a of the Darlington-connected pair. This turns off the transistors 3a and 3b, and thus causes the current I2 from the constant current source 4 to flow into and thereby charge the capacitor 5.

Thereafter, as described earlier, when the voltage of the cell 15 remains higher than the overcharge voltage for a longer period of time than the non-responsive interval, the comparator 6 outputs a high level. In response to this high level fed from the comparator 6, the buffer circuit 21 outputs a control signal and thereby turns off the MOSFET 12, disconnecting the cell 15 from the positive terminal 13. In this way, charging is stopped, and thereby the cell 15 is prevented from being brought into an overcharged state.

The power supply monitoring IC 10 may be so configured as to be capable of detecting not only an overcharge voltage of the cell 15 but also an overdischarge voltage or overcurrent. With a lithium-ion cell, the overdischarge voltage is, for example, 2.2 V. The voltage of the cell 15 is monitored, and, when this voltage becomes lower than the overdischarge voltage, the MOSFET 12, which is connected in series with the cell 15, is turned off, or alternatively another MOSFET connected in series with the cell 15 is turned off, to inhibit the use of the cell 15.

Overcurrent can be detected, for example, by the use of the MOSFET 12; specifically, the current flowing through the MOSFET 12 is monitored on the basis of the voltage drop occurring across it, and, when the current becomes higher than a predetermined value, another MOSFET connected in series with the cell 15 is turned off to prevent overcurrent. The capacitor 5 may be integrated into the power supply monitoring IC 10, or may be mounted separately. Instead of the MOSFET 12, an N-channel MOSFET may be provided on the negative terminal side (in the position indicated by A). In a battery pack 11 having a plurality of lithium-ion cells, the individual cells can be monitored and controlled by the use of a plurality of similarly-configured circuits Industrial Applicability As described above, according to the present invention, an offset voltage equal to the voltage across the transistor used to discharge a capacitor is added to a non-responsive interval setting voltage. This makes it possible to cancel manufacturing- and temperature-related variations in the characteristics of the transistor used, and thereby reduce variations in the non-responsive interval secured. Consequently, it is possible to monitor accurately the voltage of a cell and control the cell properly during charging and discharging. Thus, the present invention is very useful for a battery pack that monitors and controls a lithium-ion cell. Moreover, a Darlington-connected transistor is used to discharge the capacitor. This makes it possible to increase the discharging rate and thereby prevent malfunctioning due to continuous high-frequency noise, and also to reduce the current consumption of a power supply monitoring IC. Thus, a power supply monitoring IC or a battery pack according to the present invention is suitable for use in a portable telephone or the like.

What is claimed is:

1. A power supply monitoring integrated circuit device having a circuit for outputting a first signal indicating whether a voltage of a cell is higher than a predetermined value or not, a capacitor, a first current source for supplying a charging current to the capacitor, a transistor for forming a discharging path of the capacitor, a means for controlling charging and discharging of the capacitor according to the first signal, and a comparing means for comparing a voltage across the capacitor with a predetermined non-responsive interval setting voltage so as to output a second signal inhibiting operation of the cell when the voltage across the capacitor is higher than the non-responsive interval setting voltage, wherein an offset is added to the non-responsive interval setting voltage by using a forward voltage of a diode.

2. A power supply monitoring integrated circuit device as claimed in claim 1, wherein the transistor forming the discharging path is a Darlington-connected transistor that receives the first signal at its input electrode.

3. A power supply monitoring integrated circuit device as claimed in claim 1, wherein a serial circuit composed of a resistor and the diode is connected in series between a second current source and ground, and a node between the second current source and the serial circuit is connected to one input terminal of the comparing means.

4. A power supply monitoring integrated circuit device as claimed in claim 3, wherein the diode is composed of a transistor.

5. A power supply monitoring integrated circuit device having a circuit for outputting a first signal indicating whether a voltage of a cell is higher than a predetermined value or not, a capacitor, a first current source for supplying a charging current to the capacitor, a transistor for forming a discharging path of the capacitor, a means for controlling charging and discharging of the capacitor according to the first signal, and a comparing means for comparing a voltage across the capacitor with a predetermined non-responsive interval setting voltage so as to output a second signal inhibiting operation of the cell when the voltage across the capacitor is higher than the non-responsive interval setting voltage, wherein the transistor forming the discharging path is a Darlington-connected transistor that receives the first signal at its input electrode.

6. A battery pack having a cell, a switching device connected in series with the cell, and a power supply monitoring integrated circuit device, the switching device being turned on and off according to results of monitoring performed by the power supply monitoring integrated circuit device, wherein the power supply monitoring integrated circuit device comprises:

a circuit for outputting a first signal indicating whether a voltage of the cell is higher than a predetermined value or not;

a capacitor;

a first current source for supplying a charging current to the capacitor;

a transistor for forming a discharging path of the capacitor;

a means for controlling charging and discharging of the capacitor according to the first signal;

a comparing means for comparing a voltage across the capacitor with a predetermined non-responsive interval setting voltage so as to output a second signal inhibiting operation of the cell when the voltage across the capacitor is higher than the non-responsive interval setting voltage; and a diode of which a forward voltage is added as an offset to the non-responsive interval setting voltage.

7. A battery pack having a cell, a switching device connected in series with the cell, and a power supply monitoring integrated circuit device, the switching device being turned on and off according to results of monitoring performed by the power supply monitoring integrated circuit device, wherein the power supply monitoring integrated circuit device comprises:

a circuit for outputting a first signal indicating whether a voltage of the cell is higher than a predetermined value or not;

a capacitor;

a first current source for supplying a charging current to the capacitor;

a transistor for forming a discharging path of the capacitor, the transistor being a Darlington-connected transistor that receives the first signal at its control electrode;

a means for controlling charging and discharging of the capacitor according to the first signal; and a comparing means for comparing a voltage across the capacitor with a predetermined non-responsive interval setting voltage so as to output a second signal inhibiting operation of the cell when the voltage across the capacitor is higher than the non-responsive interval setting voltage.

* * * * *